Nov. 30, 1948.  R. E. GILMORE  2,455,168
FOLDING CHILD'S VEHICLE
Filed June 7, 1946  3 Sheets-Sheet 1
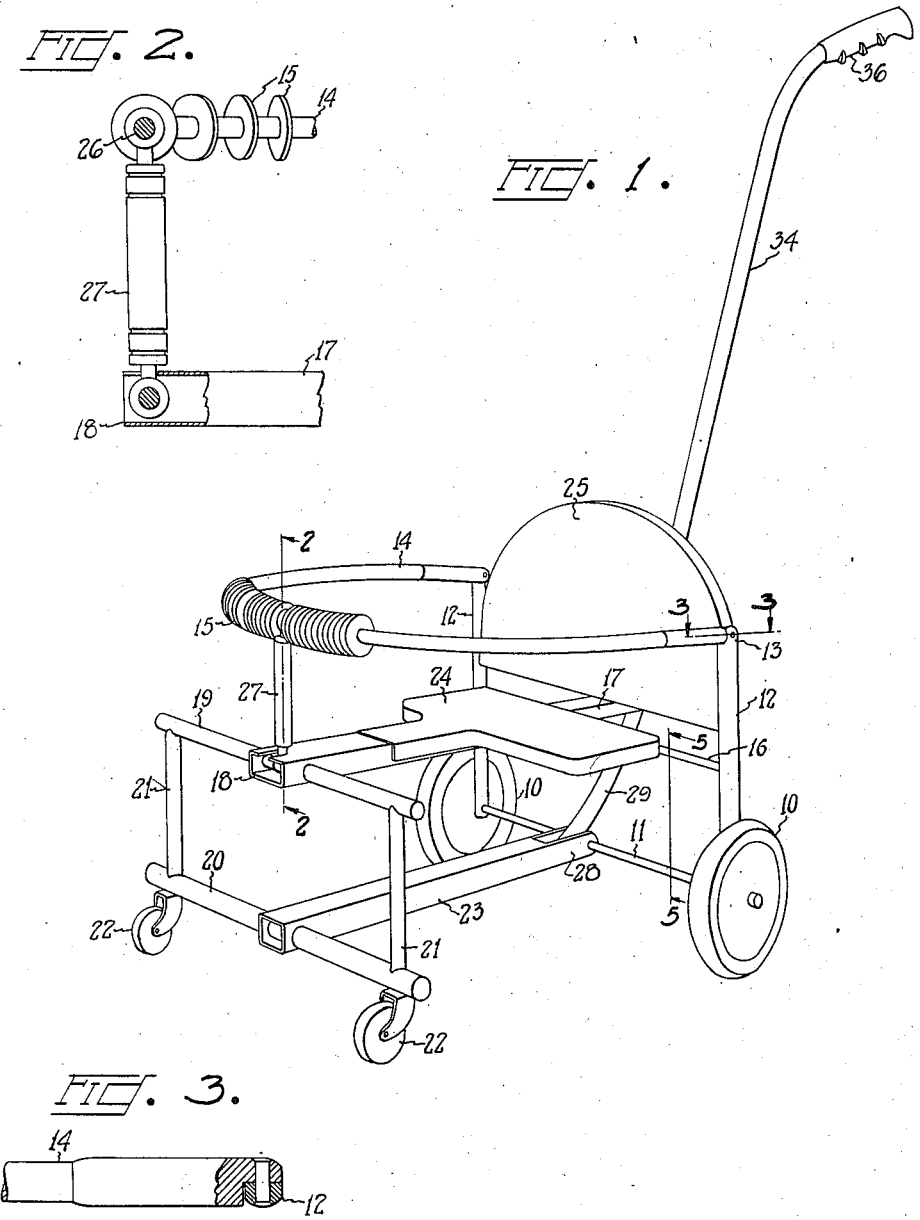
INVENTOR
ROY E. GILMORE
BY
ATTORNEY Nov. 30, 1948.  R. E. GILMORE  2,455,168
FOLDING CHILD'S VEHICLE
Filed June 7, 1946  3 Sheets-Sheet 2

INVENTOR
ROY E. GILMORE
BY
ATTORNEY

Nov. 30, 1948.　　　　R. E. GILMORE　　　　2,455,168
FOLDING CHILD'S VEHICLE
Filed June 7, 1946　　　　　　　　　　　　3 Sheets-Sheet 3
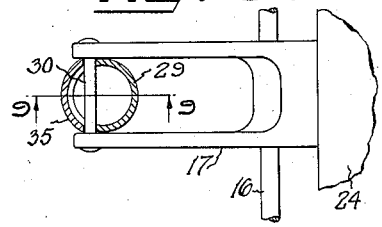
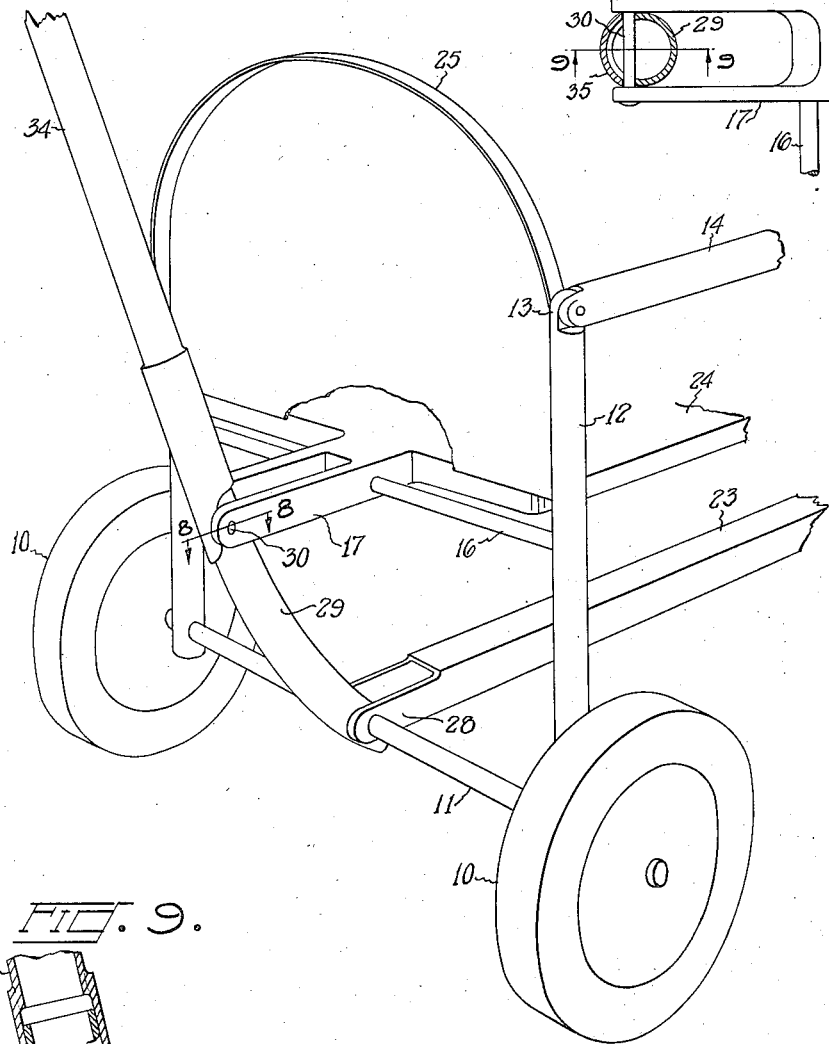
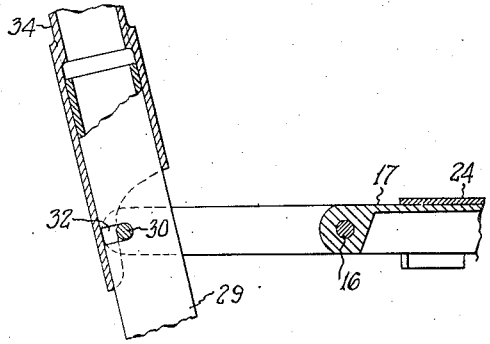
INVENTOR
ROY E. GILMORE
BY
ATTORNEY Patented Nov. 30, 1948

2,455,168

UNITED STATES PATENT OFFICE 2,455,168

FOLDING CHILD'S VEHICLE

Roy E. Gilmore, Portland, Oreg.

Application June 7, 1946, Serial No. 674,991

1 Claim. (Cl. 280—36)

This invention relates generally to vehicles for children.

The main object of this invention is to provide an exceedingly simple and efficient form of child's vehicle which can be easily collapsed and which will be light in weight, sturdy in construction, and not easily overturned.

The second object is to provide a vehicle of the class described which will not in any way interfere with the tendency to walk, but which will encourage activity in that direction.

The third object is to construct a vehicle of the class described in which the child's body is effectively protected in all directions.

I accomplish these and other objects in the manner set forth in the following specification as illustrated in the accompanying drawings, in which:

Fig. 1 is a perspective view of the vehicle in operating position.

Fig. 2 is a section taken along the line 2—2 in Fig. 1.

Fig. 3 is a section taken along the line 3—3 in Fig. 1.

Fig. 7 is a perspective view of the rear end of the vehicle.

Fig. 8 is a section taken along the line 8—8 in Fig. 7.

Fig. 9 is a section taken along the line 9—9 in Fig. 8.

Similar numbers of reference refer to the same or similar parts throughout the several views.

Figure 4:
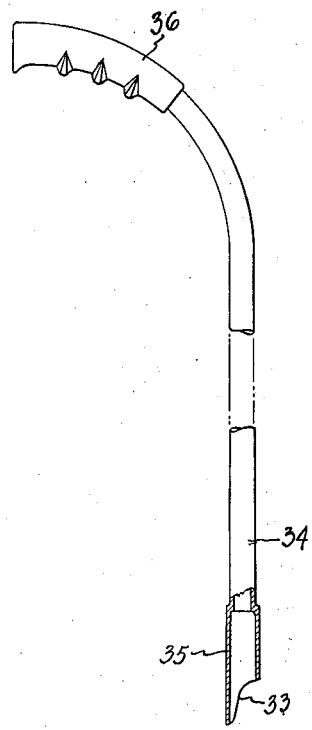
Fig. 4 is a detail of the handle.

Referring in detail to the drawing, there is shown a pair of rear wheels 10 connected by an axle 11 from which project the standards 12 to the upper ends 13 of which are hinged the U-shaped guard 14, preferably provided with sliding rings 15 for the entertainment of the child.

The standards 12 are also connected by a horizontal cross brace 16 which passes through the forked seat-supporting bar 17. The forward end 18 of the bar 17 is supported on the upper bumper bar 19, to which it is hinged. Below the bar 19 is disposed the lower bumper bar 20 which is spaced therefrom by means of the vertical spindles 21. Caster wheels 22 support the bar 20 underneath the spindles 21. The bar 20 is connected to the rear axle 11 by means of a central reach 23.

The reach 23 is at all times parallel with the seat-supporting bar 17, upon which is mounted the seat 24.

Secured between the standards 12 is a seat back 25. The rounded front end 26 of the guard 14 is held in spaced relationship to the upper bumper bar 19 by means of the vertical brace 27.

Connected to the rear axle 11 between the sides 28 of the reach 23 is the lower handle member 29, whose upper end is joined by means of a pin 30 to the member 17.

The upper end 31 of the member 29 is provided with a side slot 32 to receive the pin 30 which is fixed across the sides of the bar 17. The end 31 is cut away, as shown, to conform with the end 33 of the lower end of the handle member 34, around the outside of which is slidably placed a tube 35 which locks the members in place when the handle is in a vehicle driving position.

It can be seen that when the vehicle is in the position shown in Fig. 1 the parts are in position for use and the knees of the child as well as the upper portion of his body are fully protected from encounter with objects; also, the operator can easily steer the device by means of the grip 36 on the handle member.

Figure 6:
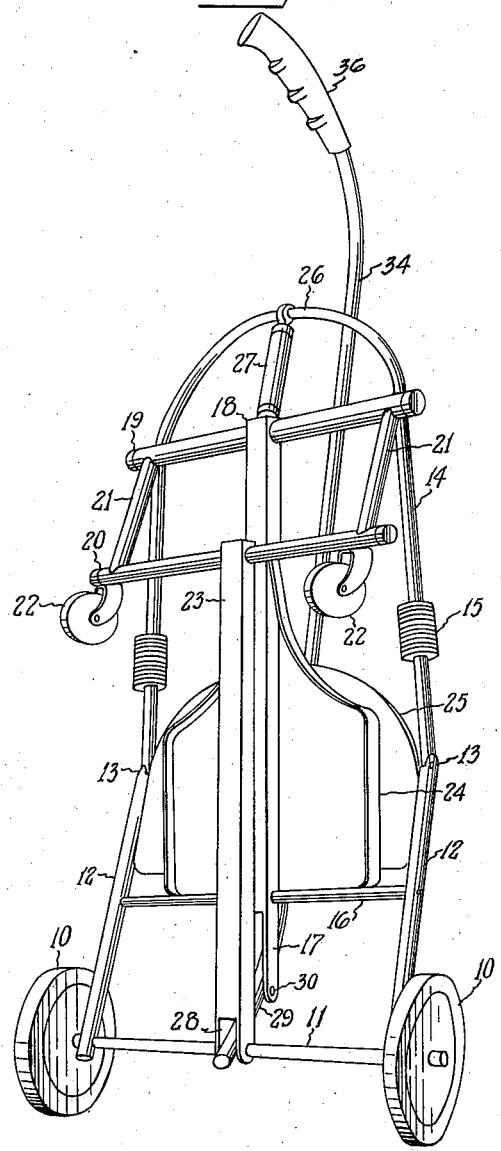
Fig. 6 is a perspective view of the folded vehicle.
Figure 5:
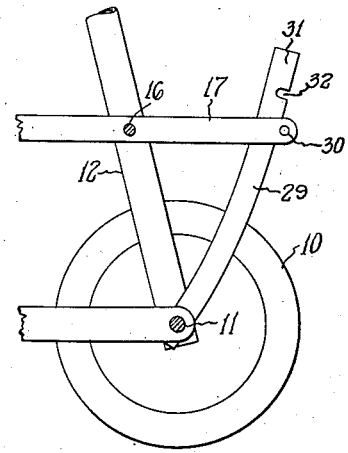
Fig. 5 is a section taken along the line 5—5 in Fig. 1 showing the first portion of the folding operation.

If it is desired to fold the device to the position shown in Fig. 6, it is only necessary to lift the handle member 34 off the handle member 29, thereby releasing the pin 30 and permitting the entire vehicle to be folded as shown.

I am, of course, aware that numerous forms of child's vehicles have been constructed in the past. I therefore do not claim such devices broadly but I do intend to cover such forms and modifications thereof as fall fairly within the appended claim.

I claim:

A child's vehicle having in combination a rear axle, ground engaging wheels at opposite ends of said axle, a lower bumper bar in front of and parallel with said axle, ground engaging caster wheels supporting the ends of said bumper, a central reach connecting said axle and lower bumper, standards mounted near the ends of said axle, a seat back between the upper ends of said standards, a cross brace between the middle portions of said standards, vertical spindles mounted on the ends of the lower bumper, an upper bumper secured across the upper ends of said spindles, a seat supporting bar hinged to the middle of said upper bumper and cross brace and extending behind said cross brace, a seat on said bar, a handle member hinged to said rear axle and to the rear end of said bar, a vertical brace on the middle of said upper bumper, a guard attached to said standards and supported at its forward ends by said vertical brace and extending around the front of the seat, said guard, said supporting bar and reach being in parallel relationship and capable of being collapsed, and a latch for holding the parts in operative or collapsed positions.

ROY E. GILMORE.

REFERENCES CITED

The following references are of record in the file of this patent:

UNITED STATES PATENTS

| Number | Name | Date |
|---|---|---|
| 1,622,108 | Hawkinson | Mar. 22, 1927 |
| 2,305,719 | Lee | Dec. 22, 1942 |
| 2,362,186 | Brantz | Nov. 7, 1944 |

FOREIGN PATENTS

| Number | Country | Date |
|---|---|---|
| 170,799 | Great Britain | Nov. 3, 1921 |
| 550,866 | Great Britain | June 23, 1942 |
| 618,223 | France | Dec. 10, 1926 |